Feb. 18, 1969  W. J. SACKETT, SR  3,428,263
MATERIALS CONDITIONER
Filed Dec. 20, 1965

INVENTOR
Walter J. Sackett, Sr.

BY  *Walter G. Finch*
ATTORNEY ated Feb. 18, 1969

3,428,263
MATERIALS CONDITIONER
Walter J. Sackett, Sr., Baltimore, Md., assignor to The A. J. Sackett & Sons Company, Baltimore, Md., a corporation of Maryland
Filed Dec. 20, 1965, Ser. No. 514,917
U.S. Cl. 241—88        3 Claims
Int. Cl. B02c *13/00;* B07b *13/00*

ABSTRACT OF THE DISCLOSURE

A hopper is provided with a bottom outlet and a lump breaking mechanism positioned in the outlet, the lump breaking mechanism comprising a grating of V-shaped members positioned across the outlet, a rotatable shaft running along the V of the V-shaped members, and a plurality of blade elements mounted to the shaft and interdigitized with the V-shaped members and which force granular material through the grating upon rotation of the shaft.

---

This invention relates generally to discharge hoppers, and more particularly it pertains to lump breaking mechanism at the discharge orifice of a hopper.

Raw materials of the pulverulent type sometimes tend to lump in storage. When these are delivered to machines for further processing, it is desired to break the lumps to small size to avoid clogging the machine.

An object of this invention is to provide a feed hopper with an improved non-clogging discharge orifice.

Another object of the invention is to provide a material feed hopper having rotating lump breaking fingers which sweep through a V-shaped grating to break and force the material therethrough.

Still another object of the invention is to provide a comminuting hopper in which wide grating elements and wide moving chopping blades intermesh edgewise.

Yet another object is to provide a rotary chopper assembly in which individual U-shaped chopper blades are arranged in a sequentially displaced manner on a square shaft.

Other objects and attendant advantages of the invention will become more readily apparent and understood from the following detailed specification and single sheet of accompanying drawings in which.

Figure 1:
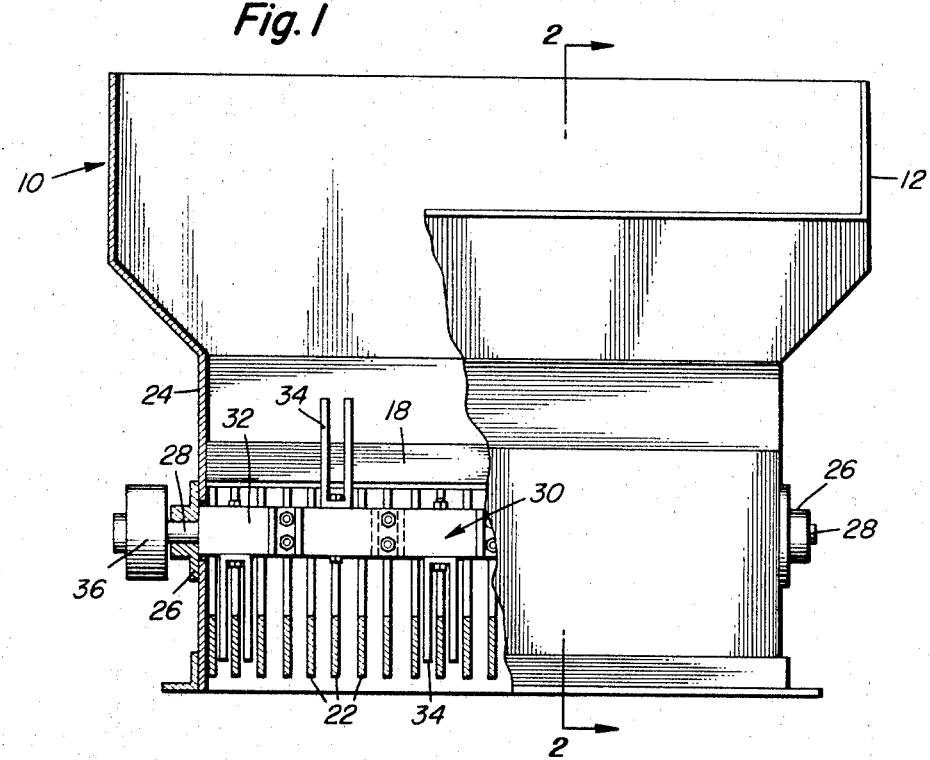
FIG. 1 is a side elevation, partly broken away of a lump breaking hopper, incorporating features of this invention.
Figure 2:
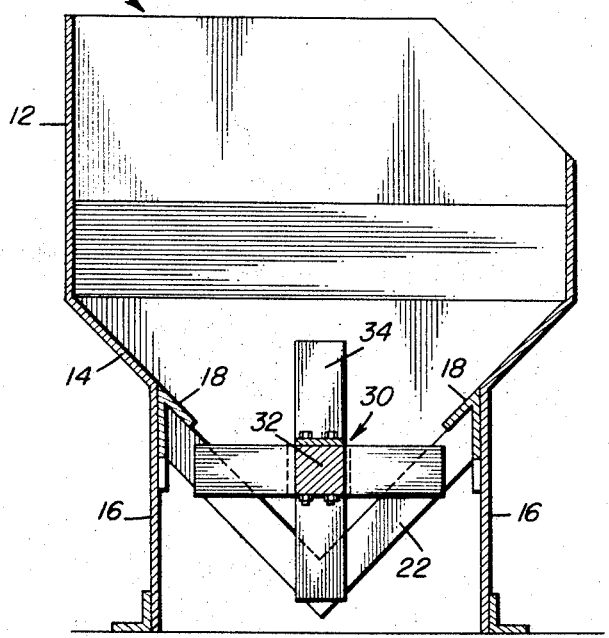
FIG. 2 is a vertical section view taken on line 2—2 of FIG. 1.

Referring now to the details of the invention as shown in FIGS. 1 and 2, reference numeral 10 indicates generally a lump breaking hopper. This hopper 10 consists of a rectangular upper portion 12 joined to a tapering lower portion 14. Support sides 16 extend vertically downward from the tapered portion 14 and between these sides 16, a pointed grill assembly 20 is mounted on acute angled structural runners 18.

Figure 3:
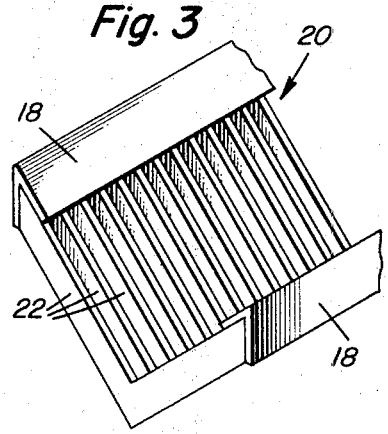
FIG. 3 is a perspective view of a portion of the grating assembly.

This grill assembly 20 shown best in FIG. 3 consists of a plurality of spaced, V-shaped members 22 cut from thin sheet metal each having a much greater width than thickness. Plates 24 are secured to the ends of the sides 16 thus forming an enclosure for the pointed grill assembly 20.

Journals 26 are mounted on the end plates 24 for stub shafts 28 between which is mounted a rotary chopper assembly 30 attached thereto. This chopper assembly 30 consists of a square shaft 32, the axis of which passes through the space between the arms of the array of V-members 22.

Blades 34 made from wide sections of narrow U-channel structural iron are fastened on to the sides of the square shaft 32 in sequentially displaced spiral order and spaced lengthwise of the shaft so as to embrace in interdigitized manner the V-members 22 during rotation.

When driven from an external source of power attached to a drive pulley 36 on one of the stub shafts 28, the blades 34 of the chopper assembly 30 move around in sequential order and crush any lumps of material introduced into the hopper 10 and force the resulting pulverized material through the grill assembly 20 in a self-cleaning manner. The thinness of the material of the blades 34 and V-members 22 combined with their relatively great width provide a rugged cooperative lump breaking structure.

Obviously many modifications and variations of the present invention are possible in light of the above teachings. It is, therefore, to be understood that within the scope of the appended claims the invention may be practiced otherwise than as specifically described.

What is claimed is:

1. A lump breaking mechanism for granular material contatined in a hopper having an outlet, comprising a grating of V-shaped members positioned across said outlet, rotatable shaft means extending lengthwise across the top of said grating and within the V of said V-shaped members, and a plurality of blade elements mounted on said shaft means in interdigitized relationship with the V-shaped members of said grating so as to force said granular material therethrough upon rotation of said shaft means.

2. The lump breaking mechanism of claim 1 wherein said blade elements are formed in pairs from a short section of U-channel having a narrow web, the said portion of said shaft to which said blade elements are secured has a square cross-section, and said respective blade elements are affixed by the said webs to flat areas of the said square cross-section portion of the shaft.

3. A lump breaking mechanism for granular material contained in a hopper having an outlet, comprising a grating of V-shaped members positioned across said outlet, rotatable shaft means extending lengthwise across the top of said grating, and a plurality of blade elements, the said blade elements being formed in pairs from a short section of U-channel having a narrow web and mounted on said shaft means in interdigitized relationship with the V-shaped members of said grating so as to force said granular material therethrough upon rotation of said shaft means.

References Cited

UNITED STATES PATENTS

| 295,554 | 3/1884 | Hudnut | 241—191 |
|---|---|---|---|
| Re. 11,634 | 10/1897 | Williams | 241—86 X |
| 704,801 | 7/1902 | Hilbert | 241—243 X |
| 2,148,547 | 2/1939 | Fiese | 241—191 X |
| 2,807,424 | 9/1957 | Records | 241—191 X |
| 3,186,651 | 6/1964 | Briolini | 241—186 |
| 1,097,420 | 5/1914 | Gardner | 241—225 |

FOREIGN PATENTS 602,969   9/1934   Germany.

JAMES M. MEISTER, *Primary Examiner.*

U.S. Cl. X.R.

241—195